United States Patent
Beichter

(10) Patent No.: US 7,734,592 B2
(45) Date of Patent: Jun. 8, 2010

(54) METHOD FOR REDUCING A DATA REPOSITORY

(75) Inventor: Friedrich Beichter, Altbach (DE)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 11/325,676

(22) Filed: Jan. 4, 2006

(65) Prior Publication Data

US 2006/0149772 A1 Jul. 6, 2006

(30) Foreign Application Priority Data

Jan. 4, 2005 (EP) .................................. 05100022

(51) Int. Cl.
*G06F 17/30* (2006.01)
(52) U.S. Cl. ....................... 707/640; 707/610; 707/691; 707/791
(58) Field of Classification Search ............... 707/1–10, 707/100–104.1, 200–206, 609–686, 687–704, 707/790–812
See application file for complete search history.

(56) References Cited

U.S. PATENT DOCUMENTS

| 6,006,232 A | 12/1999 | Lyons |
| 6,185,569 B1 * | 2/2001 | East et al. .................... 707/101 |
| 2003/0030733 A1 * | 2/2003 | Seaman et al. .............. 348/239 |

FOREIGN PATENT DOCUMENTS

EP 0789309 A2 8/1997

OTHER PUBLICATIONS

European Search Report dated Jul. 7, 2006 for DE920040044EP2.
"An Efficient Domain-Independent Algorithm for Detecting Approximately Duplicate Database Records" by A. E. Monge et al, Proceedings of the Sigmod. Workshop on Research Issues on Data Mining, May 1997, XP008060698.
"Data Compression and Gray-Code Sorting" by D. Richards, Information Processing Letters, Amsterdam, NL, vol. 22, No. 4, Apr. 17, 1986, XP002041364.

* cited by examiner

*Primary Examiner*—Isaac M Woo
(74) *Attorney, Agent, or Firm*—William A. Kinnaman, Jr.

(57) ABSTRACT

The present invention relates to a method for reducing a data repository with a plurality of sequentially ordered records. Each record is characterized by an identifier and comprises one or more data attributes and/or one or more links. The method includes the step of choosing a first record as base record and verifying whether the identifier of the sequentially next record can be generated from the base record by applying an identifier generating function. As a next step it is verified whether the data attributes and/or the links of the sequentially next record are identical with the data attributes and/or the links of the base record or can be generated from the base record by applying an attribute generating function and/or link generating function. If the above conditions are satisfied, a counter in the base record is incremented and the sequentially next record is deleted. The above steps are repeated for the subsequent records until the above conditions and are not satisfied for any record.

11 Claims, 3 Drawing Sheets

METHOD FOR REDUCING A DATA REPOSITORY

CROSS-REFERENCE TO RELATED APPLICATIONS

This application claims the priority benefit, under 35 U.S.C. § 119, of European patent application 05100022.2, filed Jan. 4, 2005, and incorporated herein by reference.

BACKGROUND OF THE INVENTION

1. Field of the Invention

The present invention relates to a method for reducing a data repository. In particular the inventive method is applicable to reduce an input/output (I/O) definition file.

2. Description of the Related Art

A data repository contains a plurality of records. The data repository is typically organized as a set of directories, which contain one or several records. The directories may be ordered in a hierarchical way, e.g. as a tree structure, where one directory is a subdirectory of the other directory. Alternatively, the directories may be ordered by references between records of one directory to records of another directory.

Modern computer systems are capable of supporting several thousand I/O units, e.g. channels, control units or devices. The task of configuring such a computer system becomes more and more difficult. In particular, the size of the resulting configuration definition file, which is required to define the accessible I/O devices, increases. With more device definitions, the number of the devices within an I/O definition file (IODF) is increasing rapidly.

The I/O definition file is an example of the above data repository. The device definition may correspond with a set of different record types. The I/O definition file may include a set of directories, which contain the records.

To overcome the problem of the large number of I/O units and the resulting size of the corresponding I/O definition file according to a conventional method, the size of I/O definition file space has been extended. But a large I/O definition file requires more virtual storage and an increased processing time, resulting in lower performance.

According to another conventional method, other data structures have been switched. But such data structures are incompatible to the existing access method.

SUMMARY OF THE INVENTION

It is an object of the present invention to provide a method for reducing a data repository, which allows an access to the reduced data repository in the same way as to the unreduced data repository.

The above object is achieved by a method as laid out in the independent claims. Further advantageous embodiments of the present invention are described in the dependent claims and are taught in the description below.

The main idea of the present invention is that the method finds generating functions, which generate subsequent records of a base record in the data repository when the generating function is applied to the identifier, attributes and links of the base record. For each attribute or link, a different generating function may be applied.

The record comprises an identifier, which uniquely identifies the record within the data repository or directory. The identifier is used to determine the order of the records in the data repository or directory, for example alphanumeric ascending order.

The record further comprises a list of attributes containing constant values and a list of links, which are references to other records of the same or a different directory within the data repository.

An example of such a generating function on a directory with a numeric identifier may be: A next identifier is generated from the previous identifier by incrementing the numeric value by the number one. The attributes of the next generated record are the same as the attributes of the base record. The links of the next generated record are the same as the links of the base record.

The number of records in the data repository or directory is reduced by finding sequences of subsequent records which can be generated from the base record of the sequence by applying the corresponding generating function. Only the base record of this sequence is kept in the directory; the other records are deleted. The base record describes a sequence of subsequent records. The sequence consists of the base record and all of the records generated from the base record by applying the generating functions.

To keep track of the number of records that can be generated from the remaining record, a counter is introduced in this record. The counter indicates the number of additional records which can be generated from the base record by applying the generating functions. This counter is stored in the record at a previously unused field, which was initialized with the number zero. Thus, the original unreduced directory is a special case of a reduced directory with all records having the sequence length of 1.

The advantage of this approach is that existing data structures are maintained and the same access methods can be used for the reduced data repository as for the previous data repository. Moreover, any new functions, e.g. the generation of additional records, also work with the previous directory structure. Further the space performance is improved by a factor of 10 to 50 and the time performance is improved by a factor of 2 to 10.

BRIEF DESCRIPTION OF THE DRAWINGS

The above as well as additional objectives, features and advantages of the present invention will be apparent in the following detailed written description.

The novel and inventive features believed characteristics of the invention are set forth in the appended claims. The invention itself, their preferred embodiments and advantages thereof will be best understood by reference to the following detailed description of preferred embodiments in conjunction with the accompanied drawings, wherein:

DETAILED DESCRIPTION OF THE INVENTION

Figure 1:
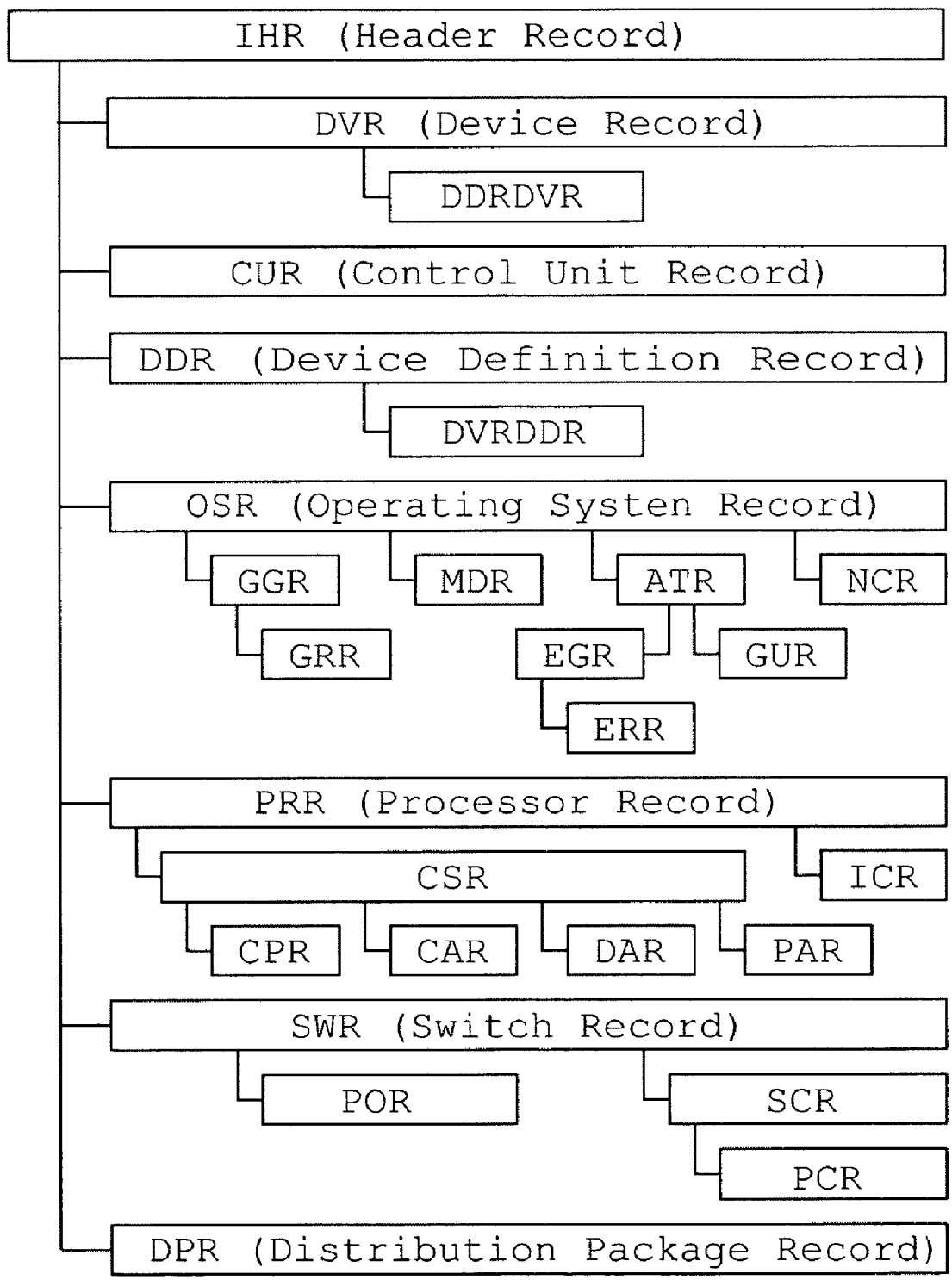
FIG. 1 shows a diagram of the logical structure of an I/O definition file.

FIG. 1 shows schematically the structure of an I/O definition file. The inventive method of reducing a data repository can be applied to the I/O definition file. The I/O definition file is a data repository which describes the I/O configuration of a central processor complex to the hardware as well as to the software. The hardware uses that definition file to build a channel subsystem. The software uses that I/O definition file to build unit control blocks. The I/O definition file allows the storing of the I/O configurations of multiple processor complexes and multiple operating systems.

The hardware needs information about the I/O configuration in order to route the I/O requests to the correct devices. This information is given via definition of channel paths, control units, devices and the interaction between them. Additionally the I/O configuration may control the accessibility of logical partitions to specific devices. The software needs device parameters and allocation tables. The allocation table describes which devices are used for data set allocation.

All this information is stored in the I/O definition file in different record types. In this example the record types are related via a hierarchical dependency. Additionally, the record types may be related by a relationship which links certain records of different types together. Each record type is organized as a binary tree, which allows efficient lookup and update operations. Correspondingly, all links between records are organized as binary trees via connection records.

The I/O definition file in FIG. 1 comprises a header record IHR. All binary trees are anchored off the header record IHR of the I/O definition file. The header record IHR comprises a control unit record CUR, a device record DVR, an operating system record OSR, a processor record PPR, a switch record SWR and a distribution package record DPR.

Further the operating system record OSR includes a multi-system device record MDR, a console record NCR, a generic group record GGR and an allocation table record ATR. The generic group record GGR has a generic device record GRR. The allocation table record ATR has an esoteric group record EGR and a generic update record GUR. At last the esoteric group record EGR has an esoteric device record ERR.

The processor record PRR includes a channel subsystem record CSR and a control record ICR. The channel subsystem record CSR has a channel path record CPR, a control unit attachment record CAR, a device attachment record DAR and a partition record PAR. The switch record SWR includes a port record POR and a switch configuration record SCR. The switch configuration record SCR has a port configuration record PCR.

References may exist between the different records. For example, if a definition between two channels is contained in the I/O definition file, then a source channel record contains a link to a target channel record and vice versa. Those references may span different processor configurations.

The device record DVR describes the general attributes of the device, i.e. the device type or the connection to control units. The device attachment record DAR describes the processor related attributes. The multi-system device record MDR describes the attributes related to the attachment of a device to an operating configuration system.

The esoteric device record ERR and the generic device record GRR describe the membership of a device in a specific device allocation unit of the operating system.

In particular, the device record DVR with its related device attachment record DAR, multi-system device record MDR, esoteric device record ERR and generic device record GRR allow the application of the inventive method for reducing the I/O definition file.

Each device is identified by a device identifier, which includes four bytes consisting of a two-byte device number and a two-byte suffix. The suffix part of the device identifier is used to produce a unique device identifier for two devices having the same device number. The device number part of the device identifier is used to build sequences of devices with subsequent device numbers using the inventive method for reducing a data repository. Only the first records DVR, DAR, MDR, ERR and GRR of each resulting sequence are kept; the other records of a sequence are removed.

To keep track of the full device identifiers after application of the inventive method, a device definition record DDR is introduced, which is organized in its own directory anchored off the header record IHR. The device definition record DDR contains the full device identifier of a device defined in the I/O definition file. It refers exactly to one device record DVR via a connection link DVRDDR. A connection link DVRDDR refers each DDR record to the DVR record that represents the sequence consuming the original device record DVR with the same device identifier.

Each remaining device record DVR describing such a sequence contains a tree of links, i.e. a connection tree DDRDVR, to device definition records DDR describing the device identifiers of the devices that are included in the sequence.

Figure 2:
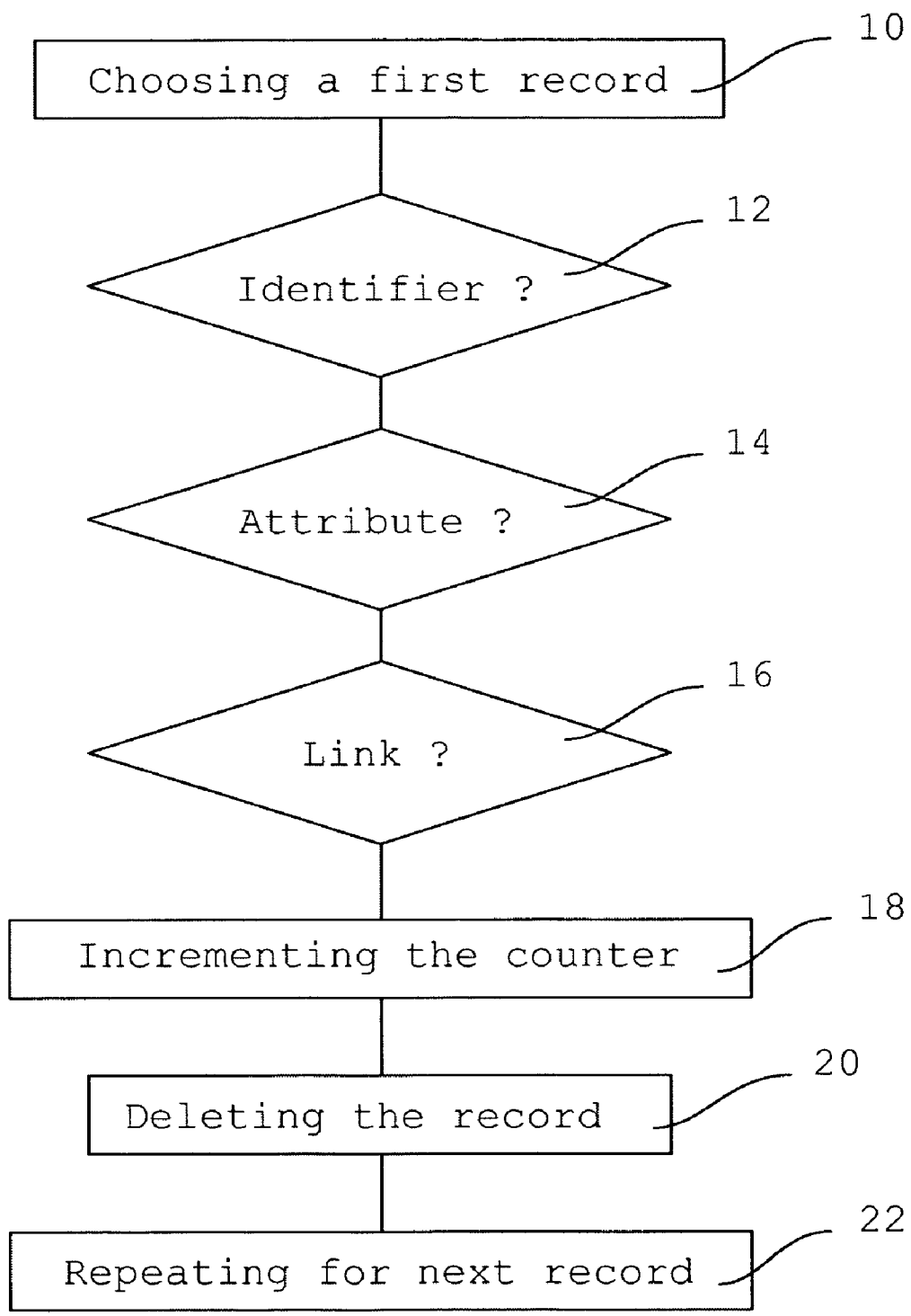
FIG. 2 shows a flow chart of a preferred embodiment of the method for reducing the I/O definition file according to the present invention.

FIG. 2 shows a schematic flow chart diagram of a preferred embodiment of the inventive method for reducing a data repository. In this embodiment the records are ordered within a directory. According to a first step 10 a first record is chosen as base record. In the next step 12 it is verified whether the identifier of the sequentially next record can be generated from the first record by applying an identifier generating function. In a further step 14 it is verified whether all attributes of the sequentially next record can be generated from the first record by applying an attribute generating function. According to step 16 it is verified whether all links of the sequentially next record can be generated from the first record by applying a link generating function.

If the conditions according to the steps 12, 14 and 16 are all satisfied, the sequentially next record is collapsed into the base record, wherein a counter in the base record is incremented by one in a step 18 and then the sequentially next record is deleted in a step 20.

The steps 12, 14, 16, 18 and 20 are repeated for subsequent records until no more reduction is possible. Then, in step 22, that record, which cannot be collapsed within the base record, becomes a new base record.

A retrieval procedure is provided to retrieve a record with a specific identifier, to retrieve a record by its absolute order number, or to retrieve the next or previous record starting from a record with a given identifier.

The searched record with a given identifier with respect to the first record id1 is to the left if identifier<id1. It is to the right if identifier>idn, where idn is the last generated record of the considered record. A match is found if id1≦identifier≦idn.

If the record is found, the record is returned by using the corresponding base record and by modifying it according to the generating functions for identifier, attributes and links. The count of subsequent generated records in the returned record is zero.

The retrieval procedure may be executed by the absolute sequence number, wherein the stored and generated records are considered.

The retrieval procedure may be executed in relation with a given identifier, wherein the first record with the given identifier is located using a retrieval by identifier, then the relative position of the searched record is determined by stepping the given number either backwards or forwards, considering both stored and generated records.

The addition of a new record with a given identifier is described below. As a first step the place of insertion is determined by the retrieval by an identifier algorithm. Then the new record is added at this place. Its sequence counter is set to zero in the next step. At last, both neighbor sequences, if they exist, are checked to determine whether the new record can be collapsed to one or both sequences to form either one, two or three sequences.

Now the updating of the attributes of the record with a given identifier is described. The sequence containing the record with the given identifier is located by the retrieval using the identifier algorithm. The sequence is expanded by storing all generating records with the corresponding sequence counter zero. The record with the given identifier is updated. Now, a regrouping is done. If a record to be updated is at the border of the original sequence, a predecessor or successor sequence is included in this process.

The deleting of the record with a given identifier is now described. The sequence containing the record to be deleted is located by the retrieval using the identifier algorithm. The sequence is expanded by storing all generating records with corresponding sequence counter zero. The record with the given identifier is deleted. Now, a regrouping is done. The original sequence remains a single sequence if the deleted record is at the border of the original sequence, or two sequences are created if the record to be deleted was in the middle of the original sequence.

The connecting of two records is described below. The sequences containing both records to be connected are located by the retrieval using the identifier algorithm. Both sequences are expanded by storing all generated records with corresponding sequence counter zero. The link is established in both records. Now, a regrouping of the sequences is done. If a record to be updated is at the border of the original sequence, the predecessor and/or the successor sequence is included in this process.

The separating of two records is now described. The sequences containing both records to be separated are located by the retrieval using the identifier algorithm. Both sequences are expanded by storing all generated records with corresponding sequence counter zero. The link is removed in both records. Now, a regrouping of the sequences is done. If a record to be updated is at the border of the original sequence, the predecessor and/or the successor sequence is included in this process.

Figure 3:
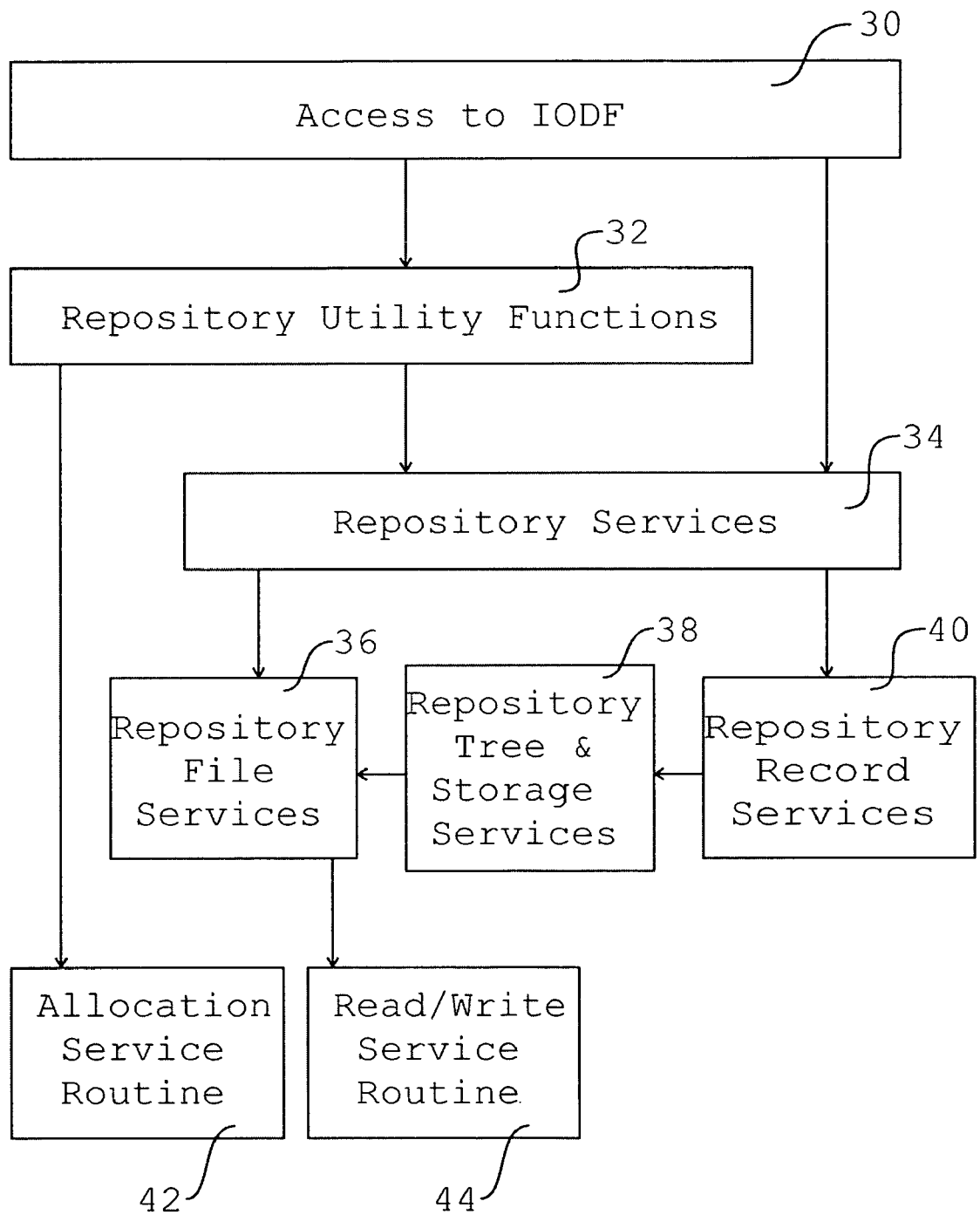
FIG. 3 shows a schematic diagram of a system according to a preferred embodiment of the present invention within an existing system.

FIG. 3 shows a schematic diagram of the realization of the present invention within an existing system. In this example the existing system provides the access to the I/O definition file 30 and comprises repository utility functions 32, repository services 34, repository file services 36, repository tree and storage services 38, repository record services 40, an allocation service routine 42 and a read/write service routine 44.

The repository utility functions 32 and the repository services 34 are provided to create, initialize, access, close and/or copy the I/O definition file. The repository utility functions 32 and the allocation service routine 42 are provided to allocate, unallocate, query and/or delete the I/O definition file.

The repository file services 36, the repository tree and storage services 38 and the repository record services 40 retrieve, update, connect, disconnect, add, migrate and/or delete the entries; they are changed to implement the inventive steps.

The repository file services 36 control the I/O accesses and determine the amount of the I/O definition file. The repository record services 40 include control logic for the single operations on the records. The repository tree and storage services 38 include the accesses and operations on the trees.

All application functions working on the I/O definition file repository use a common access module that is called via a macro interface, which supports the following operations: Retrieving to return a record definition, wherein the retrieving can be done by the identifier, by the absolute sequence number within a tree or by a sequence number relative to a given identifier; adding a record of a specific type into a specific tree; updating to change the attributes of a specific record; deleting a specific record; connecting to establish a link between two records; and disconnecting to remove a link between two record.

The device groups in the repository are implemented using the conventional record structure of the device record DVR, the device attachment record DAR and the multi-system device record MDR by adding the range value to each of these records. A device group is defined as a range of devices with consecutive device numbers, wherein all devices of the range have the same attributes and connections to other records.

To keep the full four-byte device identifier, a new tree of device definition records DDR are anchored off the header record IHR. The device definition record DDR contains the full device identifier of a device defined in the repository. The device definition record DDR points exactly to one device record DVR. Each device record DVR contains a tree of connections describing the identifiers of the devices in the device group represented by the device record DVR.

The device group consists of devices with the characteristics described below. Two-byte device numbers of all devices are in a consecutive sequence. All devices of the group have the same device type, i.e. unit, model, description and serial number. All devices of the group are attached to the same control unit or units. All devices of the group are connected to the same processors/channel subsystems and have the same corresponding processor-specific attributes, i.e. time-out, preferred channel path, device candidate list, consecutive unit addresses according to the device number sequence and sub-channel set number. All devices of the group are connected to the same operating systems and have the same corresponding attributes specified by the operating system, i.e. device type, parameters, features, console definition and sub-channel set number. For each operating system and each allocation table in the operating system, all devices of the group are connected to the same esoteric.

The I/O definition file contains device groups with the maximum number of devices. The structure of the repository with respect to device definitions is therefore changed. The header record IHR gets the device definition record DDR including a connection DVRDDR (n to 1) and the device record DVR including the connection tree DDRDVR (1 to n).

The conventional connection structures from the device record DVR to the device record DAR (1 to n), from the device record DVR to the multi-system device record MDR (1 to n), from the device record DVR to the device record CPR (n to 1), from the device attachment record DAR to the logical control unit record LCR (n to 1), from the device attachment record DAR to the partition record PAR (n to n), from the device attachment record DAR to the channel path record CPR (n to n), from the multi-system device record MDR to the graphics controller record GCR (n to 1), from the multi-system device record MDR to the console record NCR (1 to 1), from the multi-system device record MDR to the esoteric device record EGR (n to n) and from the multi-system device record MDR to the generic device record GGR (n to 1) remain unchanged.

For the conventional repository structure, the device records DVR can be viewed as device groups of the range value 1. The difference is that no device definition record DDR is available. This is not required, since the full device identifier is contained in the device record DVR.

Whenever an I/O definition file is accessed which has not been permanently upgraded to the new format, the size reduction of the I/O definition file is done temporarily and allows read access only.

When an update request to the I/O definition file data is done, a message informs the user that a permanent upgrade is necessary. This function can be performed either in the dialog with the user by upgrading the I/O definition file or using the upgrade of the batch utility. Each of these invocations results in a call to a macro, which migrates the I/O definition file to a new format.

This macro builds device groups from the device records DVR according to the following rules, wherein all device records DVR which collapse to a single group have the following characteristics. The device numbers of all devices are in a consecutive sequence. All devices within a group have the same device type, volume serial number, description and serial number. All devices within a group are attached to the same control units. All devices of the group are connected to the same processors/channel subsystems and have the same processor-specific attributes except for the unit address, which shows the same consecutive order as the device number. All devices within a group are connected to the same operating systems and have the same corresponding attributes specified by the operating system. For each operating system and each allocation table in the operating system, all devices of the group are connected to the same esoteric. Having built the groups in the storage, the following algorithm is executed to reduce the size of the I/O definition file.

For each device record DVR of the repository, the next sequential device group is got from the device group manager. This must correspond to the current device record DVR. The range is set to the size of the device group minus 1. For all devices represented by device group the device definition record DDR is added containing the full device identifier. The device definition record DDR is connected to the current device record DVR. A device records DVR of all devices of the device group are deleted except the first one. This will implicitly delete the corresponding device attachment record DAR, multi-system device record MDR, esoteric device record ERR and generic device record GRR and their connections to other records.

Now only the device attachment record DAR, the multi-system device record MDR, esoteric device record ERR and the generic device record GRR, which belong to the group of the device record DVR, remain.

For all device attachment records DAR in the repository the range is set to the range of the corresponding device record DVR. For all multi-system device records MDR in the repository the range is set to the range of the corresponding device record DVR. For all esoteric device records ERR in the repository the range is set to range of the corresponding multi-system device record MDR. For all generic device records GRR in the repository the range of the corresponding multi-system device record MDR record is set. The I/O definition file is set to the next higher version.

Whenever a request for adding, updating, connecting, disconnecting, or deleting the repository is issued involving one of the device record DVR, the device attachment record DAR or the multi-system device record MDR, the request does not apply to the whole group. In this case the device group is split into individual device groups consisting of exactly one device.

The device definition record DDR is found using the identifier of the input device. The device record DVR is located of the device group via using the offset from the device definition record DDR. If the range of the device record DVR is positive, then all device definition records DDR are connected to the device record DVR.

For the first device definition record DDR the device record DVR is updated with the range value 0 of the device record DVR. For each connected device attachment record DAR the device attachment record DAR is updated with the range value 0 of the device attachment record DAR. For each connected multi-system device record MDR record, the multi-system device record MDR is updated with range value 0 of the multi-system device record MDR and the generic device record GRR is updated with range value 0 of the generic device record GRR. For each connected esoteric group record EGR the esoteric device record ERR is updated with the range value 0 of the esoteric device record ERR.

For the further device definition record DDR the device record DVR is disconnected from the corresponding device definition record DDR. The device record DVR is added with the range value 0 of the device record DVR using device identifier of the device definition record DDR. The device record DVR is connected to the device definition record DDR. For each connected device attachment record DAR of the device record DVR the device attachment record DAR is added. For each connected partition record PAR of the device attachment record DAR the device attachment record DAR is connected to the partition record PAR.

For each connected control unit record CUR of the device record DVR the device record DVR is connected to the control unit record CUR. For each connected multi-system device record MDR of the device record DVR the multi-system device record MDR is added. The multi-system device record MDR is connected to the generic group record GGR. If the multi-system device record MDR is a graphics controller, then the multi-system device record MDR is connected with the graphics controller record GCR.

For each connected esoteric group record EGR of the multi-system device record MDR the multi-system device record MDR is connected to the esoteric group record EGR.

During the split processing, an indication is set, which prevents total device counts from being updated. An indication is set, that device groups have been split. This logic is built into a macro.

As an alternative, a split processing may split the device group into three subset groups, wherein the middle group consists of the single device to be updated. Further the split processing may split the device group into two subset groups, wherein the first or last group consists of the single device to be updated.

When the I/O definition file change is being committed and devices have been processed such that a device group change may have occurred, the following algorithm is processed. The device groups are built via opening the device group manager. For each device record DVR of the repository, the corresponding device group is located from the device group manager. If the device record DVR does not represent the device group, i.e. because of different identifiers, then the device record DVR is deleted. The device record DVR of the device group is connected to the device definition record DDR. The range of the device record DVR of the device group is incremented. For each connected device attachment record DAR of the device group DVR the range of the device attachment record DAR is incremented.

For each connected multi-system device record MDR of the device group DVR the range of the multi-system device record MDR and the generic device record GRR is incremented. For each connected esoteric group record EGR of the multi-system device record MDR the range of the esoteric device records ERR is incremented.

If all updates have been successful, then the indication that the device groups are split is reset, else a backout of the repository changes is performed.

During the merge processing, an indication is set that prevents the total device counts from being updated. This logic is similar to the upgrade logic from an existing version to a next higher version of the I/O definition file and is, therefore, built into a macro.

The program may keep track of the single device that has been updated and tries during a commit to merge that device with the neighbor groups. Performing the merge logic during each commit may be either too frequent, e.g. dialog processing, or too seldom, e.g. migration/copy processing. This can have negative effects to the performance, e.g. response time or processing duration, and to the space requirements of the I/O definition file, since more free space is required.

In an alternative approach it may be allowed to invoke the merge logic externally. The dialog could invoke the merge logic at certain checkpoints, for example, when returning from the single I/O device list to the group I/O device list, or when closing an updated I/O definition file. The migration processing routine could invoke the merge logic each time a statement has been completely processed. For the copy routines, the copy should be changed to group processing.

The present invention can also be embedded in a computer program product, which comprises all the features enabling the implementation of the methods described herein and incorporates logic in the form of instruction sequences for performing the described method steps. Further, when loaded in computer system, the computer program product is able to carry out these methods.

Although illustrative embodiments of the present invention have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the appended claims.

LIST OF REFERENCE NUMERALS

| | |
|---|---|
| 10 | step of choosing a first record |
| 12 | step of verifying the identifier |
| 14 | step of verifying the attribute |
| 16 | step of verifying the link |
| 18 | step of incrementing the counter |
| 20 | step of deleting the record |
| 22 | repeating for next record |
| 30 | access to the I/O definition file |
| 32 | repository utility functions |
| 34 | repository services |
| 36 | repository file services |
| 38 | repository tree & storage services |
| 40 | repository record services |
| 42 | allocation service routine |
| 44 | read/write service routine |
| IHR | header record |
| DDR | device definition record |
| DVR | device record |
| DAR | device attachment record |
| ERR | esoteric device record |
| GRR | generic device record |
| GGR | generic group record |
| ATR | allocation table record |
| NCR | console record |

-continued
LIST OF REFERENCE NUMERALS

| | |
|---|---|
| GUR | generic update record |
| EGR | esoteric group record |
| DPR | distribution package record |
| POR | port record |
| PCR | port configuration record |
| SWR | switch record |
| SCR | switch configuration record |
| CPR | channel path record |
| CAR | control unit attachment record |
| PAR | partition record |
| ICR | control record |
| MDR | multi-system device record |
| PRR | processor record |
| OSR | operating system record |
| CUR | control unit record |
| LCR | logical control unit record |
| GCR | graphics controller record |
| DPR | distribution package record |
| DDRDVR | connection tree connecting a device record DVR to one or more device identifier definition records DDR |
| DVRDDR | connection link connecting a device ID definition record DDR to a device record DVR |

What is claimed is:

1. A method for reducing a data repository with a plurality of sequentially ordered records, wherein each record is characterized by an identifier and comprises one or more data attributes and/or one or more links, said method comprising the steps of:

a) choosing a first record as a base record;

b) verifying whether the identifier of a sequentially next record can be generated from the base record by applying an identifier generating function;

c) verifying whether the data attributes and/or links of the sequentially next record are identical with the data attributes and/or links of the base record or can be generated from the base record by applying an attribute generating function and/or link generating function;

d) if the conditions b) and c) are satisfied, incrementing a counter in the base record and deleting the sequentially next record; and e) repeating the steps b), c) and d) for the subsequent records without resetting the counter until the conditions b) and c) are not satisfied for any record so that, upon completion of steps b), c) and d) for such records, the counter indicates the number of additional records that can be generated from the base record by applying one or more generating functions.

2. The method of claim 1, wherein the method includes the further step of:

f) setting that record which at first does not satisfy the conditions c) and d) as a new base record.

3. The method of claim 1, wherein the value of the counter is stored within the base record.

4. The method of claim 3, wherein the value of the counter is stored within an unused place of the base record.

5. The method according to claim 1, wherein said method is applicable for reducing an input/output definition file.

6. The method according to claim 1, wherein the data attributes comprise constant values.

7. The method according to claim 1, wherein one of said one or more links is a reference to one or more other records within the same or different directories.

8. The method according to claim 1, wherein the data repository comprises a set of directories.

9. The method according to claim 8, wherein the directories are structured in a hierarchical way, so that the one directory may be a subdirectory of another directory.

10. The method according to claim 8, wherein the directories are connected by references from records in one directory to records of another directory.

11. The method according to claim 8, wherein a record is uniquely identified within a directory by its identifier.

\* \* \* \* \*